US008990697B2

(12) United States Patent
Patel et al.

(10) Patent No.: US 8,990,697 B2
(45) Date of Patent: Mar. 24, 2015

(54) ASSOCIATING FILE TYPES WITH WEB-BASED APPLICATIONS FOR AUTOMATICALLY LAUNCHING THE ASSOCIATED APPLICATION

(75) Inventors: Paritosh D. Patel, Parkland, FL (US); Marc White, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 2244 days.

(21) Appl. No.: 11/834,315

(22) Filed: Aug. 6, 2007

(65) Prior Publication Data

US 2009/0044146 A1  Feb. 12, 2009

(51) Int. Cl.
  *G06F 13/00*  (2006.01)
  *G06F 3/048*  (2013.01)
  *H04L 9/32*  (2006.01)

(52) U.S. Cl.
  CPC ........................................ *G06F 3/048* (2013.01)
  USPC ............................ 715/738; 715/740; 715/749

(58) Field of Classification Search
  CPC ................................. G06F 3/048; G06F 9/542
  USPC .......................................... 715/738; 709/219
  See application file for complete search history.

(56) References Cited

U.S. PATENT DOCUMENTS

| 5,301,321 | A | * | 4/1994 | Bell et al. ....................... 718/100 |
| 6,302,698 | B1 | * | 10/2001 | Ziv-El ........................... 434/323 |
| 6,341,292 | B1 | | 1/2002 | Cho et al. |
| 7,058,696 | B1 | | 6/2006 | Phillips et al. |
| 2002/0116421 | A1 | * | 8/2002 | Fox et al. ........................ 707/526 |
| 2002/0131065 | A1 | * | 9/2002 | Sweetland et al. ............ 358/1.13 |
| 2002/0188695 | A1 | * | 12/2002 | Tso ................... 709/218 |
| 2004/0139154 | A1 | * | 7/2004 | Schwarze ..................... 709/203 |
| 2006/0015806 | A1 | | 1/2006 | Wallace |
| 2006/0112123 | A1 | | 5/2006 | Clark et al. |
| 2006/0122955 | A1 | * | 6/2006 | Bethlehem et al. ............... 707/1 |
| 2006/0168136 | A1 | * | 7/2006 | Bethlehem et al. ........... 709/219 |
| 2006/0271537 | A1 | | 11/2006 | Chandrasekharan et al. |
| 2007/0234196 | A1 | * | 10/2007 | Nicol et al. ................ 715/501.1 |

FOREIGN PATENT DOCUMENTS

| EP | 1164521 A2 | 12/2001 |
| JP | 2002197008 | 7/2002 |
| JP | 2004145604 | 5/2004 |

* cited by examiner

*Primary Examiner* — Daeho Song
(74) *Attorney, Agent, or Firm* — Patents on Demand P.A.; Brian K. Buchheit; Scott M. Garrett

(57) ABSTRACT

The present invention discloses a launching engine configured to automatically launch a Web site and load an electronic document responsive to a launching event for the electronic document. The launching engine can be a component of a computer operating system (e.g., MAC OS, OS/2, WINDOWS XP, etc.) or a graphics management component (e.g., KDE, GNOME, etc.) of a computer. A launching event can be initiated by user selection of a document icon, a user selection of an electronic document from a file management application, a launching script for the electronic document triggered by a media insertion action, and the like.

18 Claims, 4 Drawing Sheets

| Association Preferences 300 | |
|---|---|
| Order | Source |
| First 310 | Check Local ▼ 320 |
| Second 312 | Web ▼ 322 |
| Third 314 | Auto-Lookup ▼ 324 |
| Fourth 316 | Prompt ▼ 326 |

Web Application Authentication Settings 340

Web Application 342
www.writely.com ▼

(●) Automatically Authenticate 344
( ) Prompt When Opening Application

| User ID 346 | Password 348 |
|---|---|
| USER AAAA ▼ | ************ ▼ |

Accept    Cancel

FIG. 3

ASSOCIATING FILE TYPES WITH WEB-BASED APPLICATIONS FOR AUTOMATICALLY LAUNCHING THE ASSOCIATED APPLICATION

BACKGROUND

1. Field of the Invention

The present invention relates to the field of software automation technologies and, more particularly, to associating file types with Web-based applications for automatically launching the associated application.

2. Description of the Related Art

Typically, when a user of a computing system chooses to view the contents of a file, the user can double-click the file. The computing system can then determine which application to execute by first determining the file's extension, then comparing it to an association table. This table describes which application to execute for a particular file. The association table can be integrated with an operating system as is the case with the WINDOWS REGISTRY. For example, a user can click on a word processing document which causes a word processing application to execute and then opens the selected document within the application.

A growing number of Web-based applications exist that permit users to use remotely executing Web applications to perform functions traditionally requiring a locally executing application. For example, GOOGLE provides WRITELY which is a Web-based word processing application. There are instances when a user has a file to view, the user's computing system does not have the necessary application to view the file, but there is a Web-based application that can provide the same functionality. Currently, for the user to use a Web-based application, the user would have to open a Web browser, browse to the Web-based application, select the file to view from the local computer, and upload it. A more intuitive and direct way is needed to view local files in Web-based applications.

SUMMARY OF THE INVENTION

The present invention permits associating file types with Web-based applications. The disclosed invention can include an interface that permits a user to associate a file type with an application on the Web or other remote location. This interface can be implemented in an intuitive fashion which can operate in a similar fashion and/or in conjunction with a conventional file association/launching mechanism. For example, different sets of file associations can be maintained, one for local associations and one for other Web-based associations. A user configurable option can establish whether default handling should be directed towards local applications or Web-based ones. Further, when a file type is not found in the preferred association table, the secondary table can automatically be consulted and used. Explicit user selectable options, such as options of a file launching pop-up, can exist for a user to manually override default behavior.

The present invention can be implemented in accordance with numerous aspects consistent with the material presented herein. For example, one aspect of the present invention call include a launching engine configured to automatically launch a Web site and load an electronic document responsive to a launching event for the electronic document. The launching engine can be a component of a computer operating system (e.g., MAC OS, OS/2, WINDOWS XP, etc.) or a graphics management component (e.g., KDE, GNOMI, etc.) of a computer. A launching event can be initiated by user selection of a document icon, a user selection of an electronic document from a file management application, a launching script for the electronic document triggered by a media insertion action, and the like.

Another aspect of the present invention can include a software driven method for launching applications that includes a step of detecting a user selection of an electronic document. An association type can be ascertained for the electronic document. A remote Web site can be determined, that corresponds to the association type. A browser can be instantiated. The browser can be directed to the remote Web site. User identification and password parameters can be optionally provided to the Web server and used to authenticate the user. The remote Web site can load the electronic document.

Still another aspect of the present invention can include a graphical user interface (GUI) that includes at least one user selectable item and at least one Web browser interface. The user selectable item presented upon the GUI can represent a corresponding electronic document. A selection of the user selectable item can initiate a launching event. The electronic document can correspond to a previously designated association type. The association type can correspond to a previously designated Web site. The Web browser interface can be automatically presented responsive to an occurrence of the launching event. The displayed Web browser can be displayed in a state showing the Web site as it exists when the selected electronic document has been loaded into the Web site.

It should be noted that various aspects of the invention can be implemented as a program for controlling computing equipment to implement the functions described herein, or as, a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 illustrates an interface for establishing Web/local file launching preferences and settings in accordance with an embodiment of the inventive arrangements disclosed herein.

DETAILED DESCRIPTION OF THE INVENTION

Figure 1:
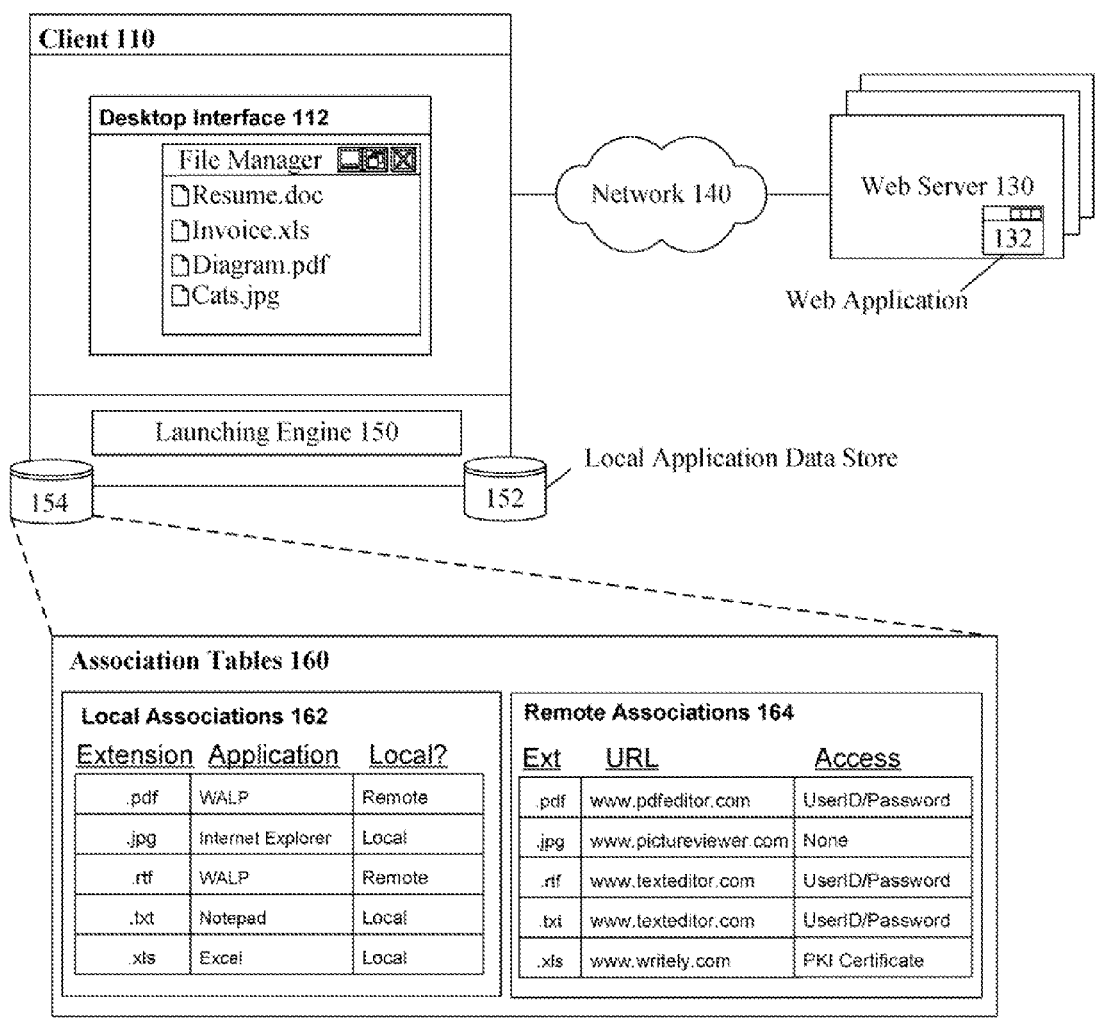
FIG. 1 is a schematic diagram of a system having a launching engine that associates file types with Web-based applications in accordance with an embodiment of the inventive arrangements disclosed herein.

FIG. 1 is a schematic diagram of a system 100 having a launching engine 150 that associates file types with Web-based applications in accordance with an embodiment of the inventive arrangements disclosed herein. In system 100, a user can associate different types of files with Web applications 132 or with applications executing from a local data store 152. These associations can be stored in one or more association tables 160 of an association data store 154. When a file of a type is activated, the launching engine 150 can determine a type of associated application associated with that file type. Thus, system 100 extends traditional file launching to include Web applications 132.

When the table 160 indicates an association with a local application, that application can be instantiated and the activated file can be opened within the instantiated application. When the table 160 indicates an association with a Web application 132, a Web browser can be opened and can be navigated to a Web site corresponding to the Web application 132. A previously configured user_id/password combination can be securely conveyed to the Web server 130 and used for authentication purposes if necessary. The activated file can then be automatically loaded into the Web application 132.

Activation of a file can occur in many different ways. For example, a user can select a file from a file management application, as shown in desktop interface 112. The user can also point and click on an icon of a file appearing in the interface 112. In still another example, an application residing on a storage medium, such as a compact disk (CD) or a flash drive, can be inserted into client 110, which causes client 110 to automatically launch the application. The activation mechanism used to select a file is ancillary to the disclosed launching engine 150 and can take any form (e.g., touch screen selection, voice command selection, hot-key triggering, etc.) and still be within the scope of the present invention.

Launching engine 150 can include a set of machine-readable instructions for launching files with their associations in the association data store 154. Launching engine 150 can be automatically invoked when a file is activated. For example, the launching engine 150 can execute when a launching event is detected.

Launching engine 150 can conform to numerous pre-existing standards which cause implementation specifics to vary based upon a software platform of the client 110. For example, WINDOWS uses its REGISTRY to define which applications are associated with which file extensions. Other launching engines 150 can base their associations on a file's Multipurpose Internet Mail Extensions (MIME) type. Different LINUX windows managers, such as KDE and GNOME, include launching engines 150 which handle launching events in various ways to achieve an effect approximately equivalent to that of the REGISTRY.

Applications associated with various types of files can be configured by users. That is, users can modify the records of the association tables 160 which results in different applications being associated with different file types. Additionally, a single file type can be associated with both a local application and a Web application 132. Configurable options can determine whether the engine 150 prefers a local application over a Web application 132 when both are associated with the same file type.

In one embodiment, a special type of application, referred to as a Web Application Launcher helper Program (WALP), can be associated with files in a local associations 162 table. The WALP can be a software plug-in or independent software application that is initially treated by a standard launching engine 150 in a manner similar to normal locally executing applications. Execution of the WALP results in a related Web application 132 being launched instead of a local application. The WALP program can consult a remote associations table 164 to determine which Web application 132 is associated with a particular file type. The table 164 can also include numerous application specific parameters that can be passed to the Web server 130 when an application 132 is invoked. For example, table 164 can include user configurable parameters, which can be used for automatic authentication. A WALP implementation permits legacy launching engines 150 to be enhanced for Web-based associations without significant internal modifications.

To illustrate, the launching engine 150 can detect a file activation having an extension of ".txt" which, from table 162, is associated with a local Notepad application which causes the Notepad application to execute. A file activation having an extension of ".pdf" or ".rtf" can cause a WALP application to execute.

When the WALP executes, the extension can be compared against records in the remote associations table 164 to determine an associated Uniform Resource Locator (URL) associated with that file type. This URL can be associated with a Web application 132 which is automatically launched within a browser of client 110. The activated file can then be uploaded to server 130 by the executing WALP program. For example, selection of the ".pdf" type can cause a browser to be instantiated and directed to "www.pdfeditor.com." The activated file can be automatically uploaded to this Web site.

Different file extensions result in different Web sites being launched in accordance with table 164. Further, optional parameters, such as authentication information, can be specified in the associations 164 table which is used to automatically upload files to the specified URLs upon launching. The optional parameters can include configuration settings that change a look-and-feel of an associated Web application to suit user preferences. Additional details, such as a preferred browser (not shown) can also be specified in table 164.

As used herein, client 110 can be any computing device through which files are able to be activated. The client 110 can include graphical and/or voice user interfaces. In one embodiment, the client 110 can include a browser which is able to render content served by remotely located Web servers 130. The client 110 can include, but is not limited to, a personal computer, a kiosk, a personal data assistant (PDA), a mobile phone, an embedded computing device, an entertainment system, a media player, and the like.

The Web server 130 can be any computing device capable of serving one or more Web applications 132 to remotely located clients 110. In one embodiment, the Web application 132 can accept user specified parameters which can be used to automatically load content, such as content associated with an activated file. The various parameters accepted by Web applications 132 can vary from application to application. The remote associations table 164 can optionally store launching parameters, application 132 specific launching scripts, and the like.

Network 140 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

Data stores 152 and 154 can be physically implemented within any type of hardware including, but not limited to, a magnetic disk, an optical disk, a semiconductor memory, a digitally encoded plastic memory, a holographic memory, or any other recording medium. Each of the data stores 152 and 154 can be a stand-alone storage unit as well as a storage unit formed from a plurality of physical devices which may be remotely located from one another. Additionally, information can be stored within each data store in a variety of manners. For example, information can be stored within a database structure or can be stored within one or more files of a file storage system where each file may or may not be indexed for information searching purposes. Information stored in data stores 152 and 154 can also be optionally encrypted. For example, authentication information for Web applications can be encrypted for added security.

Figure 2:
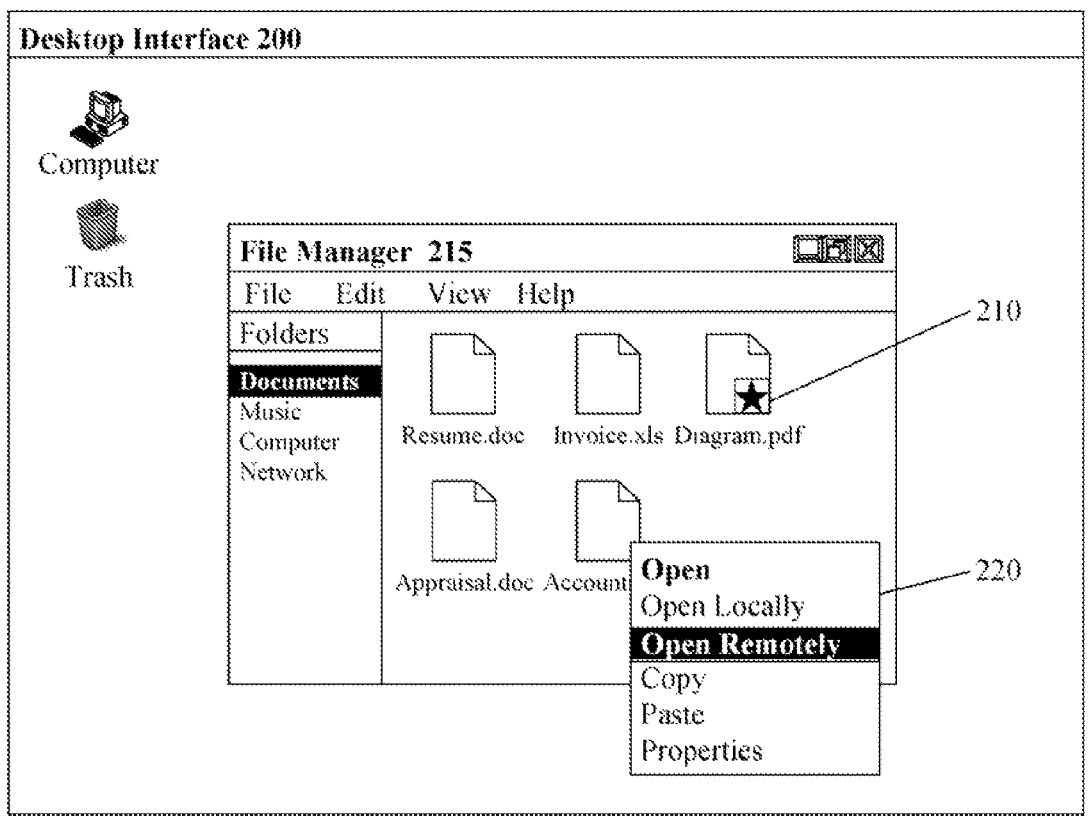
FIG. 2 illustrates a sample user interface with configurable options for associating file types with Web-based applications and/or local applications, in accordance with an embodiment of the inventive arrangements disclosed herein.

FIG. 2 shows a desktop interface 200 which can include a software application for managing files, such as file manager 215. Interface 200 represents one contemplated interface of client 110 from system 100.

File manager 215 shows graphical representations of files which a user can activate. Activation can occur through many interface options, such as a double-click, or right-clicking to bring up a pop-up menu, then selecting an activation option from the menu. In one embodiment, a graphical indicator, such as icon 210, can be displayed to indicate that a file is associated with a Web-based application. Different Web-based applications can have different associated graphical indicators.

Interface mechanisms can be provided in desktop 200 to permit a user to select whether a particular file is to be opened by a local application or a remote one when that file type is associated with both local and Web-based applications. One such interface mechanism, shown as popup menu 220, can provide selectable options to activate a file locally or remotely (using the Web-based association). This functionality is not limited to a pop-up menu and can be implemented in many ways (e.g., hot key combination, toolbar selection, etc.).

FIG. 3 shows a user interface 300 for configuring a preferential order for association handling. That is, interface 300 can be used to indicate a preferred handling order to be taken by a launching engine (e.g., engine 150 from system 100) when a file type is associated with both local and Web-based applications.

In interface 300, fields 310-316 denote the order of operations to be performed when looking up a file association. Each field 310-316 can have a user selectable preference 320-326 to customize file launching behavior.

As shown, a first 310 action can utilize local 320 file associations linked to local applications. When no local associations are associated with a file type, a second 312 preference can be utilized which is to use Web 322 based file associations. When no such associations exist, a third 314 choice can be to automatically look-up 324 a Web-based application typically associated with that type and to launch this dynamically discovered Web-based application for the activated file. A fourth 316 configuration preference can be to prompt 326 a user for an application (Web or local) to associate with the activated file type.

Interface 340 permits a user to configure settings and parameters of Web applications. In interface 340, a Web application can be selected using pull-down element 342. A user can then select 344 whether Web applications are to be automatically authenticated or whether users are to be prompted for authentication information when a Web application opens. Additional input elements, such as user_id element 346 and password element 348, can be included in interface 340 for specifying Web application specific settings.

Figure 4:
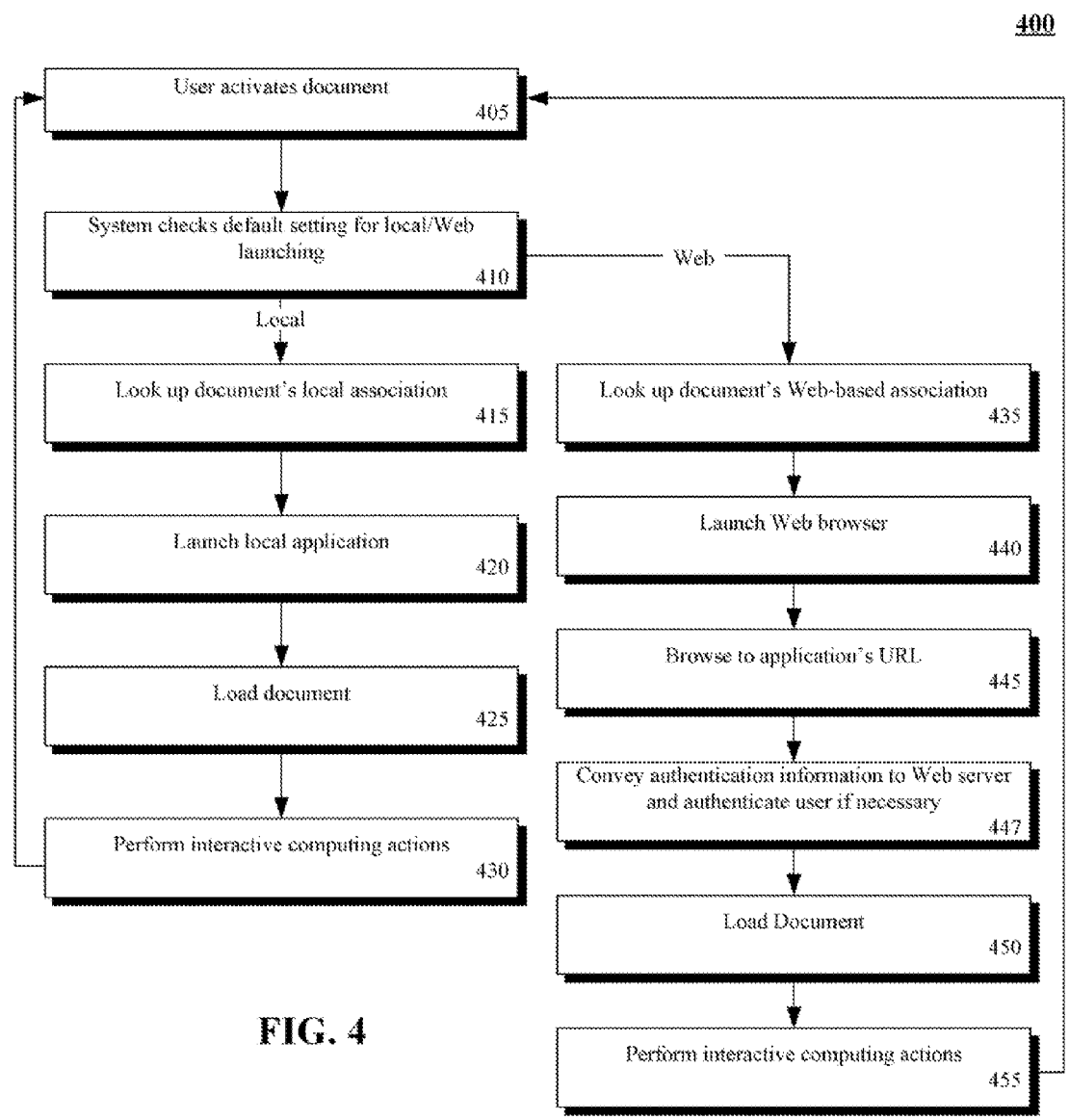
FIG. 4 is a flow chart of a method for automatically launching a Web application or a local application based on file type association settings in accordance with an embodiment of the inventive arrangements disclosed herein.

FIG. 4 is a flow chart of a method 400 illustrating a use of Web file associations as described herein. Method 400 can be performed in the context of system 100.

In step 405, a user can activate a file using an interface. In step 410, the system can check previously established file association preferences. These preferences can indicate that either a local application is associated with the file or that a Web application is associated with the file which results in local activation or Web activation launching actions.

If local activation is indicated, method 400 can progress from step 410 to step 415, where the launching engine can look-up the associated local application. In step 420, the associated application can be instantiated. In step 425, the selected file or document can be loaded into the instantiated application. In step 430, the system performs computing actions responsive to user interactions. During these interactions, a user can activate another file, causing the method to loop back to step 405.

If Web activation is indicated in step 410, the method can proceed from step 410 to step 435, where the launching engine can look-up an associated Web-based application. In step 440, a Web browser can be instantiated, if necessary. In step 445, the Web browser can be directed to a URL for the associated Web-based application. If access to the Web application is restricted, authentication information can be conveyed to the Web server which can subsequently authenticate the user, as shown by step 447. In step 450, the associated Web-based application can load or open the activated file which may require the file to be uploaded to the Web server. In step 455, the system can perform computing actions responsive to user interactions. These interactions can include a user selection that activates a different file, which results in the method looping back to step 405.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded aid executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A set of machine readable instructions stored in a non-transitory machine readable medium, said set of machine readable instructions comprising;
    a launching engine configured to automatically launch a Web site and load an electronic document responsive to a launching event for the electronic document, wherein said launching engine utilizes associations based upon file extensions to determine a Uniform Resource Locator (URL) of the Web site; and
    a file manager configured to present a pop-up menu on a graphical representation of the electronic document, the electronic document being selected and activated by a user as the launching event, wherein the pop-up menu includes a first user-selectable option to open the electronic document locally with a client side application and a second user-selectable option to open the electronic document remotely with a web browser side application, and wherein presentation of the first user-selectable option and the second user-selectable option within the pop-up menu is available only when a file extension of the electronic document is associated with both local applications and web-based applications within at least one file association table that is used by the launching engine.

2. The set of machine readable instructions of claim 1, wherein the launching engine is a component of at least one of a computer operating system and a graphics management component of a computer, wherein said component that is the launching engine is locally stored on a storage medium of the computer and executes upon the computer and determines handling when a selection of a file is made by a user through a graphical user interface of the computer, wherein said handling uses the file extension of the electronic document to determine a type of application to instantiate and load the electronic document into responsive to the launching event, wherein the component utilizes at least one association table that binds both local applications and remote Web applications, such as an application associated with the Web site to different types of file extensions.

3. The set of machine readable instructions of claim 1, wherein the user selection of the electronic document comprises clicking a graphical representation of the electronic document when a visual pointer references the graphical representation.

4. The set of machine readable instructions of claim 1, wherein the user selection of the electronic document comprises selecting at least one keyboard key when a graphical representation of the electronic document has focus within a graphical user interface.

5. The set of machine readable instructions of claim 1, wherein the launching engine is further configured to automatically launch a locally executing application and to load the electronic document into the launched application responsive to a launching event for the electronic document, wherein a determination of launching the Web site and launching the locally executing application is based upon what association type corresponds to the electronic document, wherein the association type refers to an extension associated with the electronic document and wherein in absence of utilizing the extension in at least one association table, the launching engine would not be able to determine whether the locally executing application is to be instantiated responsive to the launching event or whether the Web site is to be launched and loaded with the electronic document.

6. The set of machine readable instructions of claim 1, further comprising:
    at least one association table comprising a plurality of records relating association types with different Web sites, wherein the different Web sites are designated by URL or domain name within the at least one association table, wherein the launching engine when locally launching a Web site in accordance with the at least one association table:
    locally instantiates a Web browser and directs the Web browser to the Web site;
    uploads the electronic document over a network to a location a Web server of the Web site has access to; and
    opens the uploaded electronic document into the Web application served by the Web server so that a user is able to interact with the Web document as it is now presented within a set of Web page of the Web application served by the Web server of the Web site, said set of Web page being presented within the Web browser.

7. The set of machine readable instructions of claim 1, wherein said at least one association table associates file extensions with different local applications and different Web sites.

8. The set of machine readable instructions of claim 6, wherein at least one user configurable parameter is an authentication information for accessing the Web server.

9. The set of machine readable instructions of claim 1, further comprising:
    at least one graphic image associated with the electronic document, said graphic image specifically indicating that a launching event for the electronic document will result in the electronic document being automatically loaded in a Web site after a Web browser has been automatically instantiated.

10. The set of machine readable instructions of claim 1, further comprising:
    a Web Application Launcher helper Program (WALP) which is a locally executing program associated with at least one file type, wherein execution of the WALP results in a Web browser being instantiated and navigated to a URL of the Web site, wherein the WALP is designated in place of a locally executing application as being associated with a file extension when that file extension is associated with a Web application, and wherein the WALP when executed looks up the Web site for that specific file extension from another table, wherein look up results are used to determine the URL of the Web site.

11. A method for launching applications comprising:
    detecting a user selection of an electronic document having a file extension;
    ascertaining an association type for the electronic document by looking up the file extension in a table that indexes file extensions against local applications and different Web applications;
    determining from the file extension and entries of the table that a Web application that is one of the different Web applications is associated with the electronic document, said Web application having a corresponding remote Web site;
    instantiating a browser;
    directing the browser to the remote Web site;

the remote Web site loading the electronic document into the Web application automatically performed by a machine in accordance with a set of programmatic instructions stored in a non-transitory machine readable medium; and presenting a pop-up menu on a graphical representation of the electronic document, the electronic document being selected and activated by a user as the launching event, wherein the pop-up menu includes a first user-selectable option to open the electronic document locally with a client side application and a second user-selectable option to open the electronic document remotely with a web browser side application, and wherein presentation of the first user-selectable option and the second user-selectable option within the pop-up menu is available only when a file extension of the electronic document is associated with both local applications and web-based applications within at least one file association table that is used by the launching engine.

12. The method of claim 11, further comprising:
detecting different user selection of a different electronic document having a different file extension;
ascertaining a different association type for the different electronic document by looking up the different file extension in the table that indexes file extensions against local applications and different Web applications;
determining from the different file extension and entries of the table that a local application of the different local applications is associated with the different electronic document;
instantiating the local application; and
the local application opening the different electronic document, wherein the steps of claim 13 are automatically performed by the machine in accordance with the set of programmatic instructions.

13. The method of claim 11, further comprising:
determining previously established authentication information specific to the Web site; and
authenticating a user for the Web site using the previously established authentication information.

14. The method of claim 11, further comprising:
receiving user input to change a configuration setting in the table for the file extension from the Web application to a local application;
applying the user input to the configuration setting and responsively updating the table, where the steps of claim 11 are performed based upon an original configuration setting that specifies the remote Web site;
detecting another user selection of the electronic document having the file extension;
ascertaining the association type for the electronic document by looking up the file extension in a table that indexes file extensions against local applications and different Web applications;
determining from the file extension and entries of the table that a local application that is one of the different local applications is associated with the electronic document;
instantiating the local application; and
the local application opening the electronic document, wherein the steps of claim 15 are automatically performed by the machine in accordance with the set of programmatic instructions.

15. A computer program product stored in a non-transitory tangible storage medium comprising instructions that when executed by a processor cause a graphical user interface to be presented, wherein when said computer program product is executed, the presented graphical user interface comprises:
at least one user selectable item presented upon the graphical user interface, said user selectable item representing a corresponding electronic document having a file extension, wherein a selection of the user selectable item initiates a launching event, wherein the extension type is stored in at least one association table and corresponds to a previously designated Web site;
a Web browser interface configured to be automatically presented and to automatically display the Web site in a state in which a selected electronic document has been loaded responsive to an occurrence of the launching event, which utilizes the file extension of the association table to determine the Web site is to be presented responsive to the launching event for the electronic document having the file extension; and
a file manager configured to present a pop-up menu on a graphical representation of the electronic document, the electronic document being selected and activated by a user as the launching event, wherein the pop-up menu includes a first user-selectable option to open the electronic document locally with a client side application and a second user-selectable option to open the electronic document remotely with a web browser side application, and wherein presentation of the first user-selectable option and the second user-selectable option within the pop-up menu is available only when a file extension of the electronic document is associated with both local applications and web-based applications within at least one file association table that is used by the launching engine.

16. The computer program product of claim 15, wherein said at least one user selectable item comprises at least one said user selectable item and a different user selectable item, said different user selectable item corresponding to a different electronic document which corresponds to a different association type due to the different electronic document having a different file extension, wherein the different extension type is stored in the at least one association table and corresponds to a previously designated local application, said graphical user interface further comprising:
a local application interface for the local application configured to be automatically presented in a state in which the different electronic document has been loaded responsive to an occurrence of a different launching event corresponding to a user selection of the different user selectable item, wherein said different launching event utilizes the different file extension of the association table to determine the local application is to be presented responsive to the different launching event for the electronic document having the different file extension.

17. The computer program product of claim 15, said graphical user interface further comprising:
a visual indicator proximate to the user selectable item, said visual indicator indicating that the user selectable item is associated with a Web site which is automatically launched and the selectable item loaded whenever a user selects the user selectable item.

18. The computer program product of claim 15, said graphical user interface further comprising:
at least one interface element for permitting a user to specify authentication information to be used for a Web application, each time the Web application is initiated responsive to the launching event.

* * * * *